No. 810,997. PATENTED JAN. 30, 1906.
H. H. TAYLOR.
SELF PROPELLED VEHICLE TRUCK.
APPLICATION FILED FEB. 6, 1905.

2 SHEETS—SHEET 1.

No. 810,997. PATENTED JAN. 30, 1906.
H. H. TAYLOR.
SELF PROPELLED VEHICLE TRUCK.
APPLICATION FILED FEB. 6, 1905.

2 SHEETS—SHEET 2.

Witnesses:

Inventor:
Horace H. Taylor

UNITED STATES PATENT OFFICE.

HORACE H. TAYLOR, OF SAN JOSE, CALIFORNIA.

SELF-PROPELLED VEHICLE-TRUCK.

No. 810,997.　　　　Specification of Letters Patent.　　　　Patented Jan. 30, 1906.

Application filed February 6, 1905. Serial No. 244,449.

*To all whom it may concern:*

Be it known that I, HORACE H. TAYLOR, a citizen of the United States, residing at San Jose, in the county of Santa Clara and State of California, have invented certain new and useful Improvements in Self-Propelled Vehicle-Trucks, of which the following is a specification, reference being had to the accompanying drawings.

My invention relates to a new and improved truck for the forward wheels of self-propelled vehicles, such as automobiles, and particularly to a new and improved truck by means of which the forward wheels may be driven and at the same time the truck be permitted to turn, so that the vehicle may be directed in the proper direction and steered. It is particularly adapted to a heavier class of such self-propelled vehicles which are used for the transporting of freight or goods, although, of course, it may be applied to any type of such vehicle.

Figure 1:
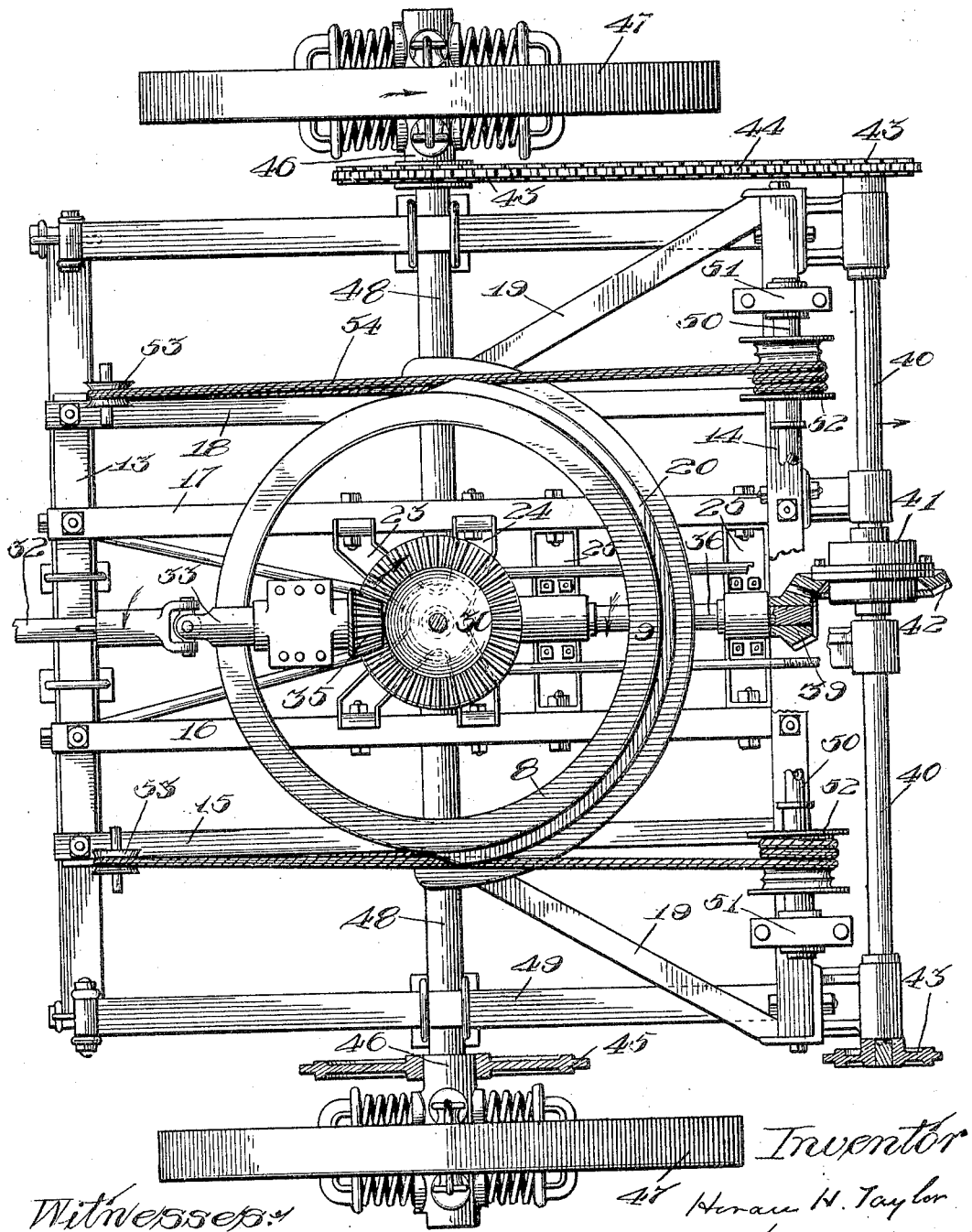
Figure 2:
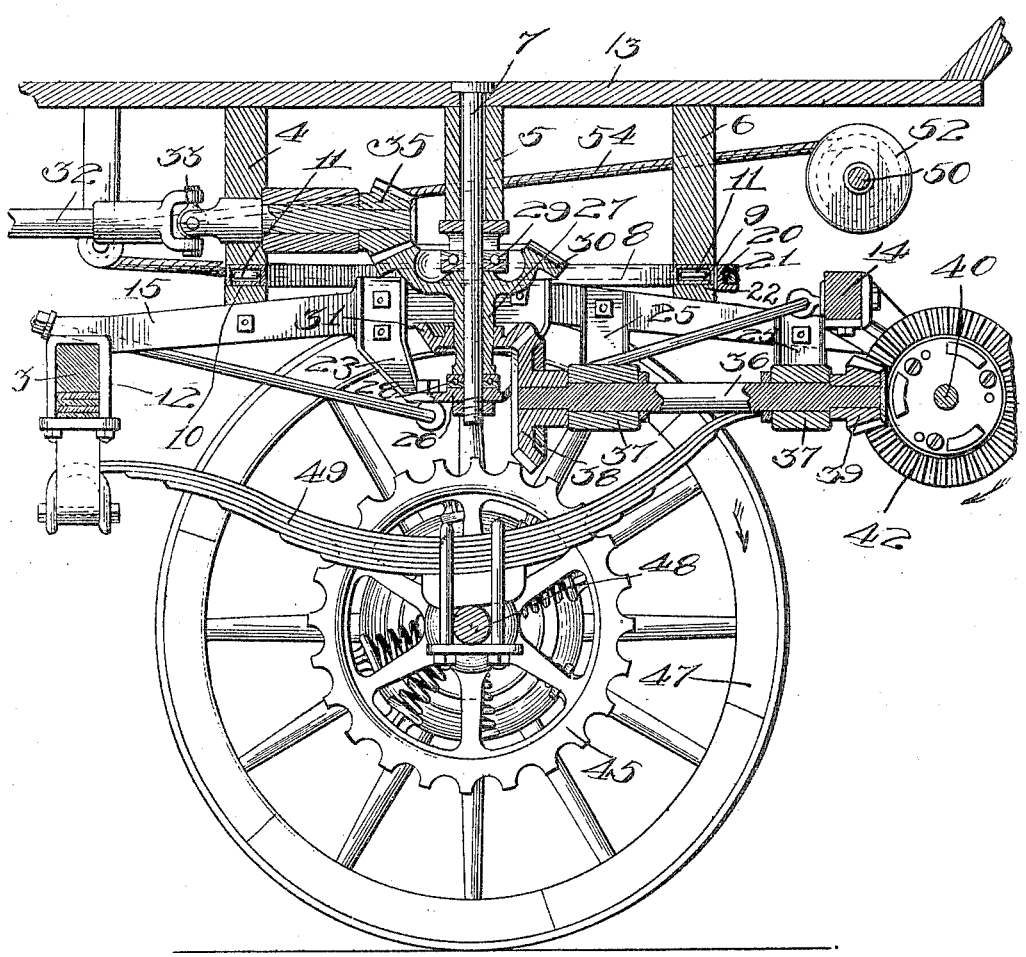

In the drawings, Figure 1 is a top or plan view with the wagon-body removed, and Fig. 2 is a medial vertical section.

Referring to the drawings, 3 represents the bottom of the wagon or vehicle body, which is provided with cross-beams 4 5 6 on its under side.

7 indicates the center pin or king-bolt, which is mounted in the vehicle-body and in the cross-beam 5 in the usual form.

8 indicates a circle or fifth-wheel which is composed of two parts 9 and 10. The upper part 9 of the circle 8 is secured to the cross-beams 4 5 6 and is rigid with the vehicle-body. The upper part 9 of the circle 8 is three-sided in section, as is best shown in Fig. 2, and between its sides moves the other portion 10 of the circle 8, with roller-bearings 11 interposed between them.

12 indicates the body of the truck, which is composed of beams 13 14, cross-beams 15 16 17 18, and diagonal braces 19, suitably bolted or otherwise fastened together. The part 10 of the circle 8 is secured to the cross-beams 15 16 17 18.

20 indicates a segment provided with flanges 21 22. The segment 20 is of a size to correspond with the circumference of the circle or fifth-wheel 8 and lies around a portion of its periphery in close proximity thereto and is bolted or otherwise secured to the cross-beams 15 16 17 18.

23 24 25 indicate brackets which are bolted to and suspended from the cross-beams 16 17.

26 indicates a bearing which is secured to and supported by the brackets 23 24 and may be formed integral therewith.

27 indicates a sleeve which is journaled upon the king-bolt 7 and bears at its lower end upon ball-bearings 28, interposed between the end of the sleeve and the bearing 26 and is provided with ball-bearings 29 at its upper end.

30 indicates a bevel-gear which is secured to and preferably formed integral with the sleeve 27 on its upper end.

31 indicates a bevel-gear which is keyed or otherwise secured to the sleeve 30.

32 indicates a shaft which leads to the prime mover of the vehicle, which may be of any well-known kind and description and attached to the vehicle in any well-known and approved way, and hence is not shown.

33 indicates a shaft which is journaled in suitable journals supported from below the wagon-body 3 and is connected by a universal-joint coupling 34 with the forward end of the shaft 32.

35 indicates a bevel-gear which is keyed or otherwise secured to the forward end of the shaft 33 and meshes with the bevel-gear 30.

36 indicates a shaft which is journaled in suitable journals 37, supported upon the brackets 25.

38 indicates a bevel-gear which is keyed or otherwise secured to the inner or rear end of the shaft 36 and meshes with the bevel-gear 31.

39 indicates a bevel-gear which is keyed or otherwise secured to the outer or forward end of the shaft 36.

40 indicates a divided shaft provided with a differential gear-drum 41, which is provided with a bevel-gear 42, secured to one of its members and meshing with the bevel-gear 39. The shaft 40 upon each end carries sprocket-wheels 43, which are connected by sprocket-chains 44 to sprocket-wheels 45. The sprocket-wheels 45 are keyed or otherwise secured to the hubs 46 of the forward wheels 47, which are journaled upon the ends of the axle 48. The axle 48 is supported from the truck in any well-known manner by means of springs 49.

50 indicates a shaft which is journaled in suitable bearings 51, which are supported in any suitable manner below the bottom of the wagon-body 33.

52 indicate drums which are secured to the shaft 50 upon each side of the circle 8.

The shaft 50 is adapted to be rotated by any suitable device, such as a long lever, wheel, or other steering mechanism, which may be of any well-known and approved kind and carried by the vehicle in any well-known way, and hence not shown.

53 indicates pulleys which are supported in suitable bearings from the wagon-body 3.

54 indicates a rope which is secured at one end to and partially wound around one of the drums 52, passes thence forward around one of the pulleys 53, thence around the segment 20 between the flanges 21 22, thence forward around the other pulley 53, and back to the other drum 52, around which it is wound and to the other end is secured.

The operation of the mechanism above described is as follows: When the shaft 32 is driven in the direction indicated by the arrow on Fig. 1, the shaft 33 will be driven and the rotation communicated through bevel-gear 35 to the bevel-gear 30, which will be rotated in the direction indicated by the arrow in Fig. 1. By means of the bevel-gears 31 38 the rotation will be communicated to the shaft 36 through the bevel-gears 39 42 to the differential gear-drum 31, thence to the divided shaft 40, and thence through sprockets-wheels 43 46 and sprocket-chain 44 and the wheels 46, which being rotated in the direction indicated by the arrow in Fig. 2 will help to drive the vehicle forward. When it is desired to turn the front truck for the purpose of guiding or steering the vehicle, the shaft 50 is rotated in a suitable direction, which by the winding of the rope 54 upon one of the drums 52 and off from the other will by the engagement of the rope with the segment 20 turn the entire front truck to one side or the other, the lower part 10 of the circle 8 turning in the upper member 9 of the circle 8. At the same time it will be obvious that the positive driving of the wheels 47 through the shaft 32 will not in any way be interfered with, any difference in motion between the wheels on the two sides of the vehicle being taken up or compensated in the usual way through the differential-gearing drum 41.

By means of my improved invention it will be seen that I have devised new and improved mechanism by which the power from the prime mover of self-propelled vehicles may be communicated not only to the rear wheels, as is usually done, but to both the front and rear wheels, and so communicated to the front wheels in such a manner as not to interfere with the turning of the forward truck upon which the forward wheels are carried for the purpose of turning or steering the vehicle.

I have not deemed it necessary to illustrate or describe the rest of the vehicle or wagon or the rear wheels and the manner in which they may be driven, as these portions of the vehicle form no part of my present invention and may be of any well-known and approved form and description.

That which I claim as my invention, and desire to secure by Letters Patent, is—

1. In a truck for self-propelled vehicles, the combination with a circle, a truck-frame secured to one member of said circle, wheels carried by said truck-frame, and means for turning said truck on said circle, of gearing carried by said truck-frame concentric with said circle, means for driving said gearing, a divided shaft journaled in said frame, differential gearing connecting the members of said shaft, an intermediate shaft journaled in said frame and geared respectively with the gearing on said circle and with said divided shaft, substantially as described.

2. In a truck for self-propelled vehicles, the combination with a circle, a truck-frame secured to one member of said circle, wheels carried by said truck-frame and means for turning said truck on said circle, of gearing carried by said truck-frame concentric with said circle, means for driving said gearing, a divided shaft journaled on said frame, differential gearing connecting the members of said shaft, a gear on said shaft, an intermediate shaft journaled on said frame, gears on said intermediate shaft meshing respectively with said first-named gearing and with the last-named gear on said divided shaft, and connections between said shaft and said wheels.

3. In a front truck for self-propelled vehicles, the combination with a circle, a truck-frame secured to one member of said circle, wheels carried by said truck-frame and means for turning said truck on said circle, of gearing carried by said truck-frame concentric with said circle, means for driving said gearing, a divided shaft journaled in said frame, differential gearing connecting the members of said shaft, an intermediate shaft journaled on said frame, gears on said intermediate shaft and meshing, respectively, with the first-named gearing and with gearing on said differential gearing, and connections between said shaft and said wheels.

4. In a front truck for self-propelled vehicles, the combination with a vehicle-body, a truck-frame, a circle composed of two members one secured to said vehicle-body and the other to said truck-frame, and means for turning said truck on said circle, of a sleeve rotatably carried on said truck-frame concentric with said circle, bevel-gears on said sleeve at each end thereof, a shaft journaled in said truck-frame and adapted to be connected with a prime mover carried by said vehicle and provided with a gear meshing with one gear on said sleeve, a divided shaft carried by said truck-frame and provided with differential gearing, an intermediate shaft journaled in said truck-frame and provided with bevel-gears at each end adapted to mesh, respectively, with the other bevel-gear on said sleeve and with the differential gearing on said shaft, an axle carried by said truck-frame, wheels on said axle, and connections between said shaft and said wheels.

5. In a front truck for self-propelled vehicles, the combination with a vehicle-body, a truck-frame, a circle composed of two members secured, respectively, to said vehicle-body and said truck-frame, gearing carried by said truck-frame concentric with said circle, means for driving said gearing, wheels carried by said truck-frame, and gearing connections between said first-named gearing and said wheels, of a grooved segment secured to said truck-frame concentric with said circle, a shaft journaled on said truck-frame, drums journaled on said shaft, and a rope engaging said segment and adapted to be wound and unwound upon said drums, respectively, when the same are rotated.

6. In the front truck for self-propelling vehicles, the combination with a vehicle-body, a truck-frame, wheels carried by said truck-frame, a circle composed of two members secured respectively to said vehicle-body and said truck-frame, a pin mounted in said vehicle-body concentric with said circle, a bevel-gear revolubly mounted on said pin and provided with a hub, and means for driving said gear, of a gear secured to said hub, a divided shaft carried by said truck-frame, differential gearing connecting the members of said divided shaft, an intermediate shaft, gearing on said intermediate shaft connecting the same with the gear on said hub and with said divided hub, and connections between said divided shaft and said wheels, substantially as described.

HORACE H. TAYLOR.

Witnesses:
J. J. BENNETT,
L. J. WOODWARD.